United States Patent
Kawamura et al.

(10) Patent No.: US 9,216,711 B2
(45) Date of Patent: Dec. 22, 2015

(54) HEAD PROTECTION AIRBAG APPARATUS

(71) Applicant: TOYODA GOSEI CO., LTD., Kiyosu-shi, Aichi-ken (JP)

(72) Inventors: Koji Kawamura, Kiyosu (JP); Naoki Hotta, Kiyosu (JP); Ryosuke Jinnai, Kiyosu (JP); Masaaki Okuhara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/560,000

(22) Filed: Dec. 4, 2014

(65) Prior Publication Data

US 2015/0158450 A1    Jun. 11, 2015

(30) Foreign Application Priority Data

Dec. 6, 2013 (JP) ................................. 2013-253536

(51) Int. Cl.
- *B60R 21/213* (2011.01)
- *B60R 21/217* (2011.01)
- *B60R 21/232* (2011.01)
- *B60R 21/231* (2011.01)

(52) U.S. Cl.
CPC ............. *B60R 21/217* (2013.01); *B60R 21/213* (2013.01); *B60R 21/231* (2013.01); *B60R 21/232* (2013.01)

(58) Field of Classification Search
CPC .. B60R 21/232; B60R 21/231; B60R 21/217; B60R 21/213
See application file for complete search history.

(56) References Cited

U.S. PATENT DOCUMENTS

| | | | |
|---|---|---|---|
| 7,210,886 B2 * | 5/2007 | Kawai et al. | 411/508 |
| 7,374,200 B2 * | 5/2008 | Ikeda et al. | 280/728.2 |
| 2005/0062263 A1 * | 3/2005 | Kawai et al. | 280/728.2 |
| 2012/0291240 A1 * | 11/2012 | Suzuki | 24/633 |
| 2012/0313354 A1 * | 12/2012 | Ochiai et al. | 280/728.2 |
| 2013/0300091 A1 * | 11/2013 | Kim et al. | 280/728.1 |
| 2014/0042734 A1 * | 2/2014 | Suga et al. | 280/730.2 |
| 2014/0056663 A1 * | 2/2014 | Fukumoto | 411/22 |
| 2014/0062066 A1 * | 3/2014 | Mori et al. | 280/728.2 |

FOREIGN PATENT DOCUMENTS

| | | | |
|---|---|---|---|
| JP | 2005-047325 A | | 2/2005 |
| JP | 2006088985 A | * | 4/2006 |
| JP | 2013180725 A | * | 9/2013 |

* cited by examiner

*Primary Examiner* — Faye M Fleming

(74) *Attorney, Agent, or Firm* — Posz Law Group, PLC

(57) ABSTRACT

A head protection airbag apparatus includes an airbag which is configured so that an attaching portion arranged on an upper edge thereof upon completion of inflation is attached to a body of the vehicle using an attaching clip. The attaching portion includes an attaching hole to which the attaching clip is insertable. The attaching clip includes an attaching leg. The attaching leg includes an insertion shaft portion adapted to be inserted in the locking hole and at least a pair of locking claws. The attaching hole is configured so that, when the attaching leg is inserted through the attaching hole, an peripheral edge portion of the attaching hole is pressed against an outer peripheral surface side on a region of the insertion shaft portion which is located more toward the base portion than the locking claws.

3 Claims, 11 Drawing Sheets

HEAD PROTECTION AIRBAG APPARATUS

CROSS-REFERENCE TO RELATED APPLICATIONS

This application claims the benefit of Japanese Patent Application No. 2013-253536 (filed on Dec. 6, 2013), the entire contents of which are incorporated herein by reference.

BACKGROUND

1. Technical Field

The present invention relates to a head protection airbag apparatus, in which an attaching portion formed on an upper edge of an airbag upon completion of inflation is adapted to be attached to a body of a vehicle using an attaching clip.

2. Related Art

Conventionally, in a head protection airbag apparatus of a configuration in which an attaching portion is attached to a body using an attaching clip, the attaching clip is configured to have an attaching leg intended to be locked on a peripheral edge of a locking hole in the body. The attaching leg has an insertion shaft portion adapted to be inserted in the locking hole and a pair of locking claws arranged to be opposed to each other in a direction generally perpendicular to an axis of the insertion shaft portion and formed to protrude outward from the insertion shaft portion. Also, in such a conventional head protection airbag apparatus, after the airbag has been folded, the attaching leg of the attaching clip is inserted through an attaching hole formed in the attaching portion, thereby temporarily fixing the attaching clip to the attaching portion. Then, the attaching leg of the attaching clip with the attaching portion attached thereto is inserted into the locking hole formed in the body of the vehicle, so that the attaching portion is attached to the body of the vehicle and thus the airbag is attached to the body of the vehicle (for example, see JP-A-2005-047325).

However, in the conventional head protection airbag apparatus, when the attaching clip is temporarily fixed to the attaching portion, a spacer, which is a separate body from the attaching clip, is fitted into a region of the insertion shaft portion of the attaching leg protruding from the attaching portion, which is located more toward a base portion thereof than the locking claws, thereby preventing the attaching clip from being separated from the attaching hole.

Accordingly, in order to solve the above problems, an object of the present invention is to provide a head protection airbag apparatus, in which an attaching clip can be attached to an attaching portion without using a spacer.

SUMMARY

According to an aspect of the invention, a head protection airbag apparatus includes:

an airbag that is made of a flexible sheet material, has a bag shape into which an inflation gas is flowable, is folded and received in an upper edge of a window of a vehicle and is deployed and inflated to cover the window, wherein the airbag is configured so that an attaching portion arranged on an upper edge thereof upon completion of inflation is attached to a body of the vehicle using an attaching clip, wherein the attaching portion includes an attaching hole to which the attaching clip is insertable, wherein the attaching clip includes an attaching leg with which the attaching portion is attachable to a the body by being inserted into a locking hole formed in the body while being inserted in the attaching hole, wherein the attaching leg includes an insertion shaft portion adapted to be inserted in the locking hole and at least a pair of locking claws arranged to be opposed to each other in a direction generally perpendicular to an axial direction of the insertion shaft portion and formed to protrude outward from the insertion shaft portion, wherein the locking claws is formed to protrude from the insertion shaft portion while being expanded toward a base portion of the insertion shaft portion, wherein, when the insertion shaft portion is inserted into the locking hole, the locking claws is first bent and then restored to be locked on a peripheral edge of the locking hole, and wherein the attaching hole is configured so that, when the attaching leg is inserted through the attaching hole, an peripheral edge portion of the attaching hole is pressed against an outer peripheral surface side on a region of the insertion shaft portion which is located more toward the base portion than the locking claws.

According to the head protection airbag apparatus of the present invention, when the attaching leg of the attaching clip is inserted into the attaching hole formed in the attaching portion of the airbag, the peripheral edge portion of the attaching hole is pressed against an outer peripheral surface on a region of the insertion shaft portion of the attaching leg, which is located more toward the base portion than the locking claws. Therefore, a high frictional force between the peripheral edge portion of the attaching hole and the outer peripheral surface of the insertion shaft portion is created, so that the insertion shaft portion is hardly separated from the attaching hole and upon temporarily fixing, the attaching clip can be temporarily fixed to the attaching portion by inserting the attaching leg of the attaching clip into the attaching hole without using a spacer, thereby keeping the attaching clip temporarily fixed to the attaching portion. As a result, no spacer is required, thereby reducing the number of components. Also, because all one has to do is insert the attaching leg into the attaching hole, an operation of attaching a spacer is unnecessary, thereby reducing working man-hours.

Thus, according to the head protection airbag apparatus of the present invention, the attaching clip can be temporarily fixed to the attaching portion without using a spacer.

Also, according to the head protection airbag apparatus of the present invention, when protrusions intended to be abutted to end surfaces of the locking claws oriented in a separation direction are arranged, on at least two sides of the peripheral edge portion of the attaching hole facing the locking claws, to integrally protrude from the peripheral edge portion, this is preferable in that the protrusions are locked on the end surfaces of the locking claws, thereby further inhibiting the attaching leg from being separated from the attaching hole.

DETAILED DESCRIPTION

Figure 1:
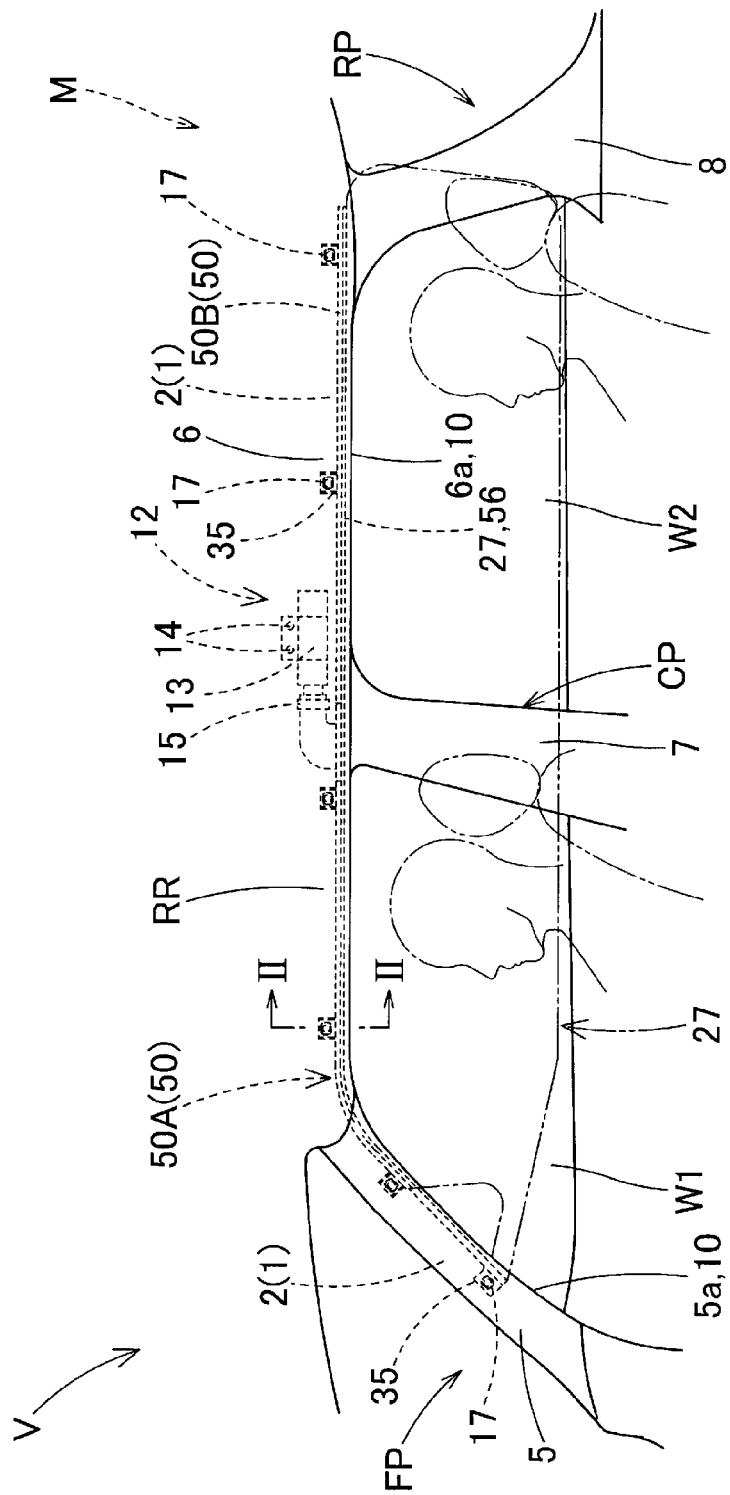
FIG. 1 is a schematic front view showing a head protection airbag apparatus according to one embodiment of the present invention as viewed from an inboard side of a vehicle.

One embodiment of the present invention will be now described on the basis of the accompanying drawings. As shown in FIG. 1, a head protection airbag apparatus M according to the embodiment has an airbag 27, which is folded and received in an upper peripheral edge of windows (side windows) W1 and W2 of a vehicle V, i.e., over a range extending from a front pillar FP to the vicinity of an upper part of a rear pillar RP via a roof side rail RR, thereby allowing the airbag 27 to cover the windows W1 and W2 upon completion of inflation. In the embodiment, the vehicle V has one center pillar CP arranged between the front pillar FP and the rear pillar RP generally along an upward-downward direction, and the airbag 27 upon completion of inflation is configured to cover, together with the windows W1 and W2, an inboard side, including a center pillar garnish 7 disposed on the center pillar CP and a part of a rear pillar garnish 8 disposed on the rear pillar RP as shown by a two-dot chain line in FIG. 1.

In the embodiment, unless otherwise specified, upward-downward, and front-rear directions will be respectively described to correspond to upward-downward, and front-rear directions of the vehicle V when having been mounted in the vehicle.

Figure 2:
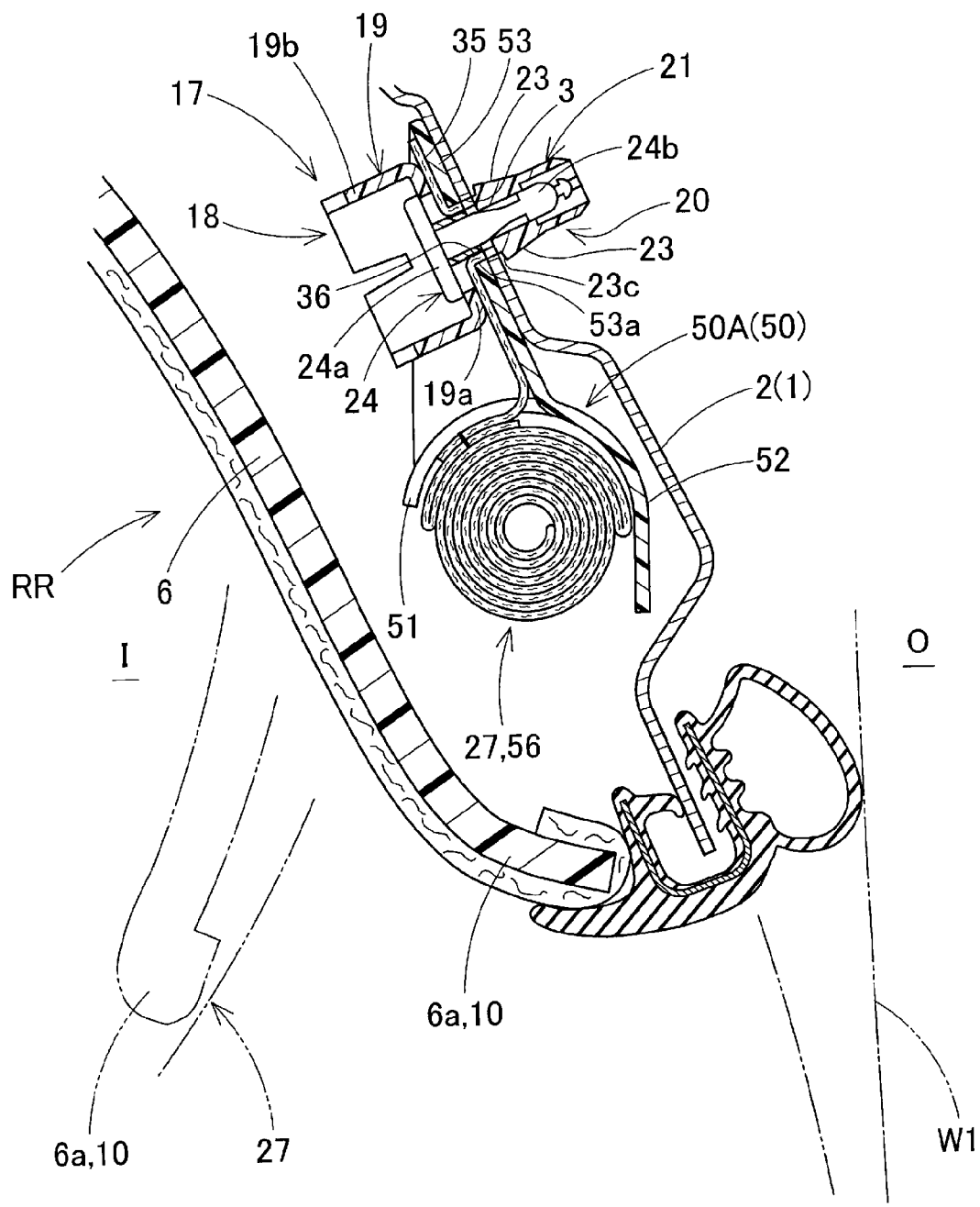
FIG. 2 is a longitudinal sectional view showing a state where the head protection airbag apparatus of the embodiment has been mounted in a vehicle, corresponding to a section taken along a line II-II in FIG. 1.

As shown in FIGS. 1 and 2, the head protection airbag apparatus M includes the airbag 27, an inflator 12 for supplying an inflation gas to the airbag 27, an attaching bracket 13, attaching clips 17, and a case 50 for receiving the folded airbag 27. The folded airbag 27, the inflator 12 and the case 50 are received so that, when having been mounted in the vehicle, an inboard side I thereof is coved by an airbag cover 10 (see FIGS. 1 and 2). In the embodiment, the airbag cover 10 is constituted of a lower edge 5a of a front pillar garnish 5 adapted to cover an inboard side of the front pillar FP and a lower edge 6a of a roof head lining 6 adapted to cover an inboard side of the roof side rail RR.

The front pillar garnish 5 and the roof head lining 6, together with the center pillar garnish 7 and the rear pillar garnish 8, are made of synthetic resin and are attached to the inboard side I of an inner panel 2, which is a member of the front pillar FP or the roof side rail RR located on a body 1 side thereof, by an attaching means, not shown. Also, the airbag cover 10 constituted of the lower edges 5a and 6a is configured to be pushed by the airbag 27 upon deployment and inflation and thus to allow the lower edges 5a and 6a to be opened to the inboard side I, thereby allowing the airbag 27 to protrude outward (see a two-dot chain line in FIG. 2).

As shown in FIG. 1, the inflator 12, which is intended to supply an inflation gas to the airbag 27, is of a cylinder type having a generally columnar shape and is provided, on a distal end thereof, with a gas discharging port, not shown, for discharging the inflation gas. The distal end of the inflator 12, including the vicinity of the gas discharging port region, is inserted into a connection port portion 30, as described below, of the airbag 27, and then the inflator 12 is connected to the airbag 27 using a clamp 15 arranged on an outer periphery of a rear end of the connection port portion 30. Also, the inflator 12 is attached to the inner panel 2 using the attaching bracket 13 for holding the inflator 12 and bolts 14 for fixing the attaching bracket 13 to the inner panel 2 on the body 1 side.

The attaching clip 17 for attaching an attaching portion 35 of the airbag 27 to the body 1 is adapted to be locked in a locking hole 3 formed in the inner panel 2 as shown in FIG. 2. The attaching clip 17 is of an expandable rivet type made of synthetic resin and has an attaching base 18 and a pushpin 24 disposed in the attaching base 18 (see FIGS. 2 to 6).

The attaching base 18 has a receiving portion 19 arranged on the inboard side I for receiving a collar portion 24a of the pushpin 24 and an attaching leg 20 extending from the receiving portion 19 toward an outboard side O (toward the inner panel 2) to be attached on a peripheral edge of the locking hole 3. The receiving portion 19 is formed in a generally rectangular box shape, in which the inboard side I thereof is opened so that the pushpin 24 can be pressed therethrough, and has a backing plate portion 19a for sandwiching the attaching portion 35 of the airbag 27 together with an attaching piece 53, as described below, of the case 50 therebetween and a side wall portion 19b extending from an outer peripheral edge of the backing plate portion 19a toward the inboard side I (see FIGS. 2 and 6).

The attaching leg 20, which is of a generally quadrangular prism shape protruding from the receiving portion 19 toward the outboard side O, has an insertion shaft portion 21 adapted to be inserted into the locking hole 3 and a pair of locking claws 23 and 23 arranged to be opposed to each other in an upward-downward direction, which corresponds to a direction perpendicular to an axis of the insertion shaft portion 21.

Figure 6:
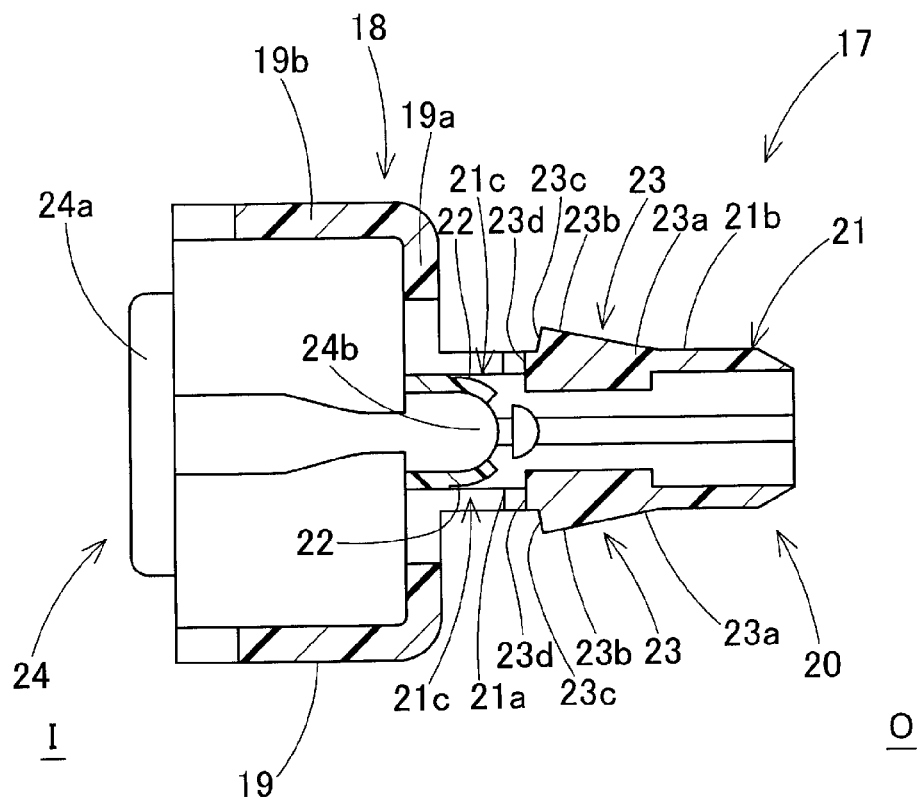
FIG. 6 is an enlarged longitudinal sectional view of the attaching clip of FIG. 3, corresponding to a section taken along a line VI-VI in FIG. 3.

In the embodiment, the insertion shaft portion 21 has a generally rectangular cross-sectional shape which has a broad width in a front-rear direction (see FIG. 10), and, as shown in FIGS. 3 to 6, the locking claws 23 and 23 are respectively arranged on upper and lower surfaces thereof, which have such a broad width. As shown in FIG. 6, the insertion shaft portion 21 is configured to have a hollow interior. On a region of a base portion 21a of the insertion shaft portion 21, which is located more toward the inboard side I than a location, at which the locking claws 23 are arranged, and thus corresponds to a side thereof located toward the receiving portion 19, a generally tubular-shaped temporary fixing portion 22 for holding and temporarily fixing an expandable shaft portion 24b of the pushpin 24 before being pushed is formed to protrude inward therefrom. The temporary fixing portion 22 is arranged to be close to a location corresponding to the inboard side I of the locking claws 23. The temporary fixing portion 22 has such a thin thickness that, upon pushing of the pushpin 24, the temporary fixing portion 22 is bent to be expanded and thus to allow the pushpin 24 to be pushed toward the outboard side O. Outer peripheral sides of the temporary fixing portion 22 in the upward-downward direction, which is located toward the base portion 21a of the insertion shaft portion 21, are configured to be recessed in a concave shape. Namely, in the attaching clip 17 of the embodiment, recessed portions 21c are arranged to be recessed inward from an outer peripheral surface 21b on a region of the base portion 21a side of the insertion shaft portion 21, which corresponds to a base side (inboard side I) of the locking claw 23 (see FIGS. 6 and 10).

Figure 3:
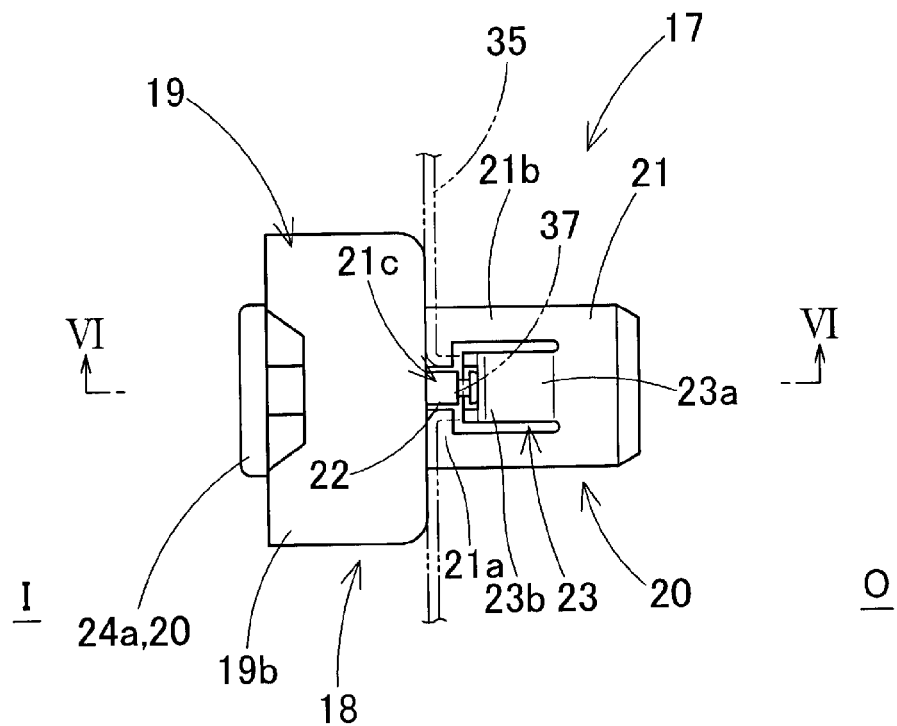
FIG. 3 is a plan view of an attaching clip used in the head protection airbag apparatus of the embodiment.

The pair of locking claws 23 and 23 arranged to be opposed to each other in the upward and downward direction are of a flat plate shape and, as shown in FIG. 3, are formed to be connected to the insertion shaft portion 21 at outboard-side ends 23a thereof and also to protrude from the insertion shaft portion 21 while being expanded toward inboard-side ends 23b thereof (end located toward the base portion 21a of the insertion shaft portion 21) (see FIG. 6). Namely, each locking claw 23 is formed to be inclined with respect to an axial direction of the insertion shaft portion 21 so that the inboard-side end 23b protrude from the insertion shaft portion 21 outward in the upward-downward direction, and also is configured so that the inboard-side end 23b can be bent inward in the upward-downward direction. Also, the locking claw 23 has an inboard-side end surface formed in a stepped shape, and thus includes an outer end surface 23c arranged on the inside in the upward-downward direction and an inner end surface 23d arranged on the outside in the upward-downward direction and located more toward the inboard side I than the outer end surface 23c. In addition, the locking claw 23 is adapted so that the outer end surface 23c of the inboard-side end 23b, which is arranged on the outside in the upward-downward direction, is locked on a peripheral edge of the locking hole 3 when the insertion shaft portion 21 is inserted into the locking hole 3 (see FIG. 2).

As shown in FIG. 6, the pushpin 24 has the collar portion 24a and the expandable shaft portion 24b extending from the collar portion 24a toward the outboard side O and adapted to be disposed between the locking claws 23 and 23 upon pushing thereof. The pushpin 24 before being pushed is arranged so that a distal end of the expandable shaft portion 24b is held by the temporary fixing portion 22, and in such a state before the pushpin 24 is pushed, each of the locking claws 23 and 23 is adapted so that the inboard-side end 23b can be bent inward in the upward-downward direction. Also, when the pushpin 24 is strongly pressed toward the outboard side O, holding of the expandable shaft portion 24b by the temporary fixing portion 22 is released. Therefore, as shown in FIG. 2, the pushpin 24 is pushed toward the outboard side O and the expandable shaft portion 24b is inserted and locked between the locking claws 23 and 23 so that the locking claws 23 and 23 do not come near to each other.

Figure 7:
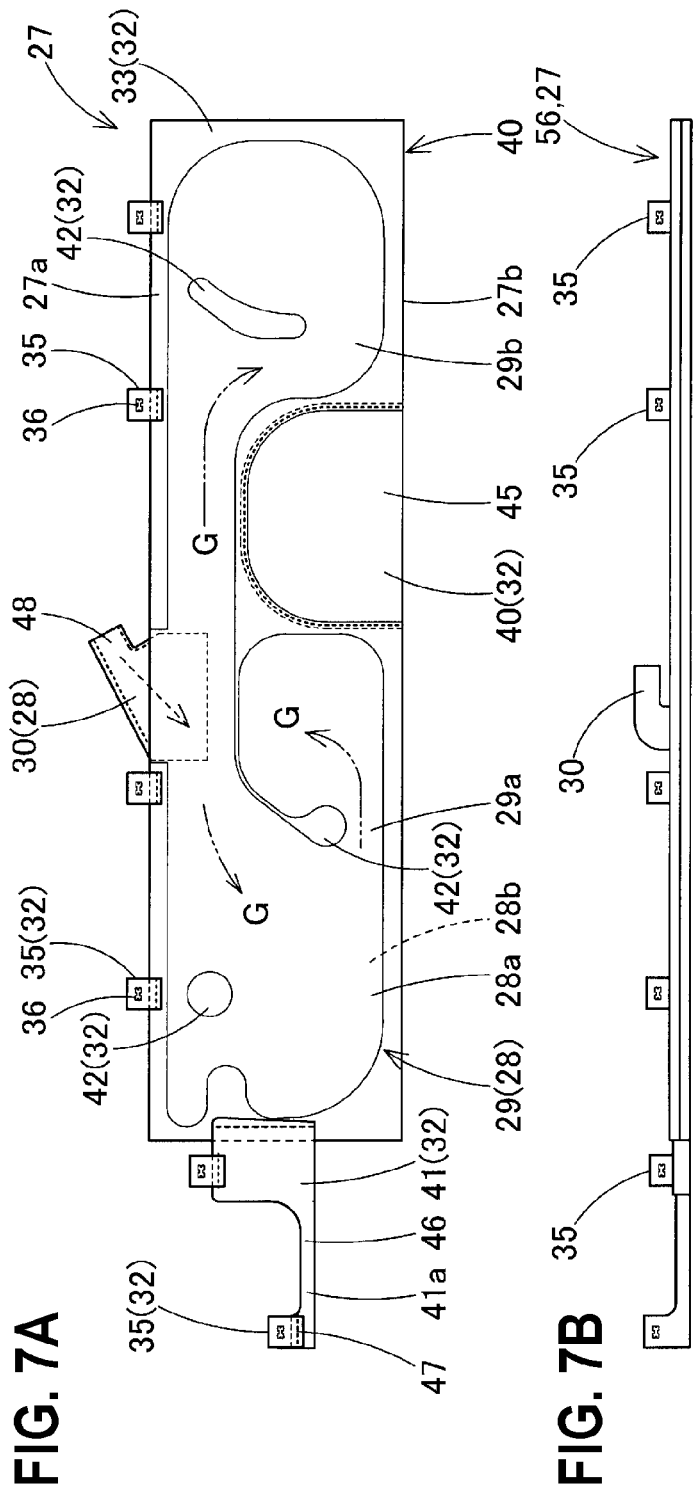
FIGS. 7A to 7C are a front view showing a state where an airbag used in the head protection airbag apparatus of the embodiment is flatly deployed and views showing a state where the airbag is folded and then the attaching clip is attached to an attaching portion thereof.

As shown by a two-dot chain line in FIG. 1, the airbag 27 is configured to be deployed from a folded state by the inflation gas flowed from the inflator 12 thereinto and thus to be deployed and inflated to cover the inboard sides of the windows W1 and W2, the center pillar garnish 7 of the center pillar CP and the rear pillar garnish 8 of the rear pillar RP. As shown in FIG. 7A, the airbag 27 has a gas inflow section 28, which allows the inflation gas G to be flowed thereinto and thus is inflated to separate an inboard-side wall 28a and an outboard-side wall 28b thereof from each other, and a non-inflow section 32, which is formed to couple the inboard-side wall 28a and the outboard-side wall 28b to each other and thus does not allow the inflation gas to be flowed thereinto. In the embodiment, the gas inflow section 28 has a protective inflation portion 29 and the connection port portion 30, and the non-inflow section 32 has a peripheral edge portion 33, attaching portions 35, plate-shaped portions 40 and 41 and a closing portion 42.

As shown in FIG. 7A, the protective inflation portion 29 of the gas inflow section 28 has a front protective portion 29a adapted to cover the window W1 on a lateral side of a front seat, when the airbag 27 has been completely inflated, and a rear protective portion 29b adapted to cover the windows W2 on a lateral side of a rear seat. The connection port portion 30 is formed to protrude upward from an upper edge 27a of the airbag 27 and also to be opened on a rear end thereof to allow the inflator 12 to be connected thereto. The front protective portion 29a and the rear protective portion 29b have the closing portion 42 arranged in an interior region thereof, so that, when the airbag 27 has been completely inflated, a width dimension thereof in the front-rear direction is reduced from those in a flatly deployed state and a thickness thereof is limited, thereby keeping a plate shape extending in the front-rear direction.

The peripheral edge portion 33 in the non-inflow section 32 is formed to enclose an outer peripheral edge of the gas inflow section 28 over the entire region thereof, except the read end side of the connection port portion 30. The plate-shaped portion 40 is disposed between the front protective portion 29a and the rear protective portion 29b and formed in a generally rectangular plate shape. The plate-shaped portion 41 is disposed on a front end side of the airbag 27 and is of a generally rectangular plate shape, and also, on a lower end side thereof, a belt portion 41a, which extends forward in a generally band shape, is disposed.

In the embodiment, the attaching portions 35 are parts which are arranged on the upper edge 27a of the airbag 27 as well as the plate-shaped portion 41 and are intended to attach the upper edge 27a of the airbag 27 to the inner panel 2, which corresponds to the body 1 of the vehicle V. The attaching portions 35 are plurally arranged in the front-rear direction (in the embodiment, 6 pieces), and each is formed to protrude upward from the upper edge 27a of the airbag 27 as well as an upper edge of the plate-shaped portion 41 and a front end of the belt portion 41a. In each attaching portion 35, an attaching hole 36, through which the attaching leg 20 of the attaching clip 17 can be inserted, is formed.

Figure 8:
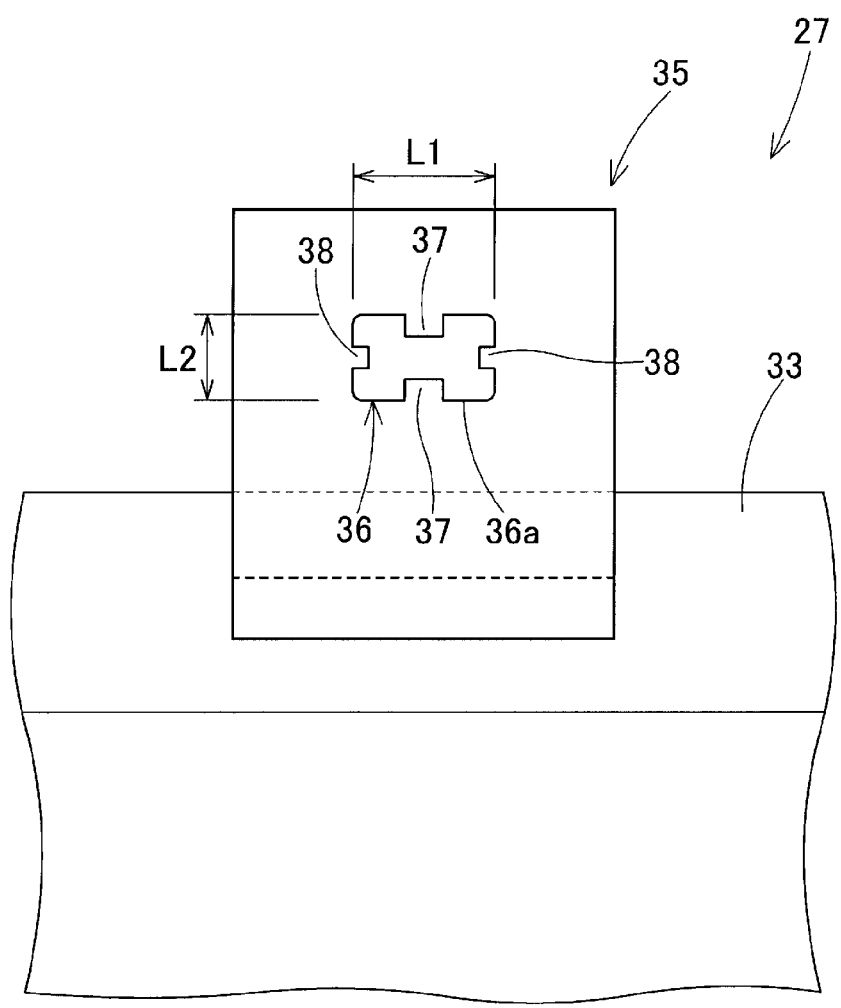
FIG. 8 is a partially enlarged front view showing a region of the attaching portion in the airbag of FIG. 7.

The attaching hole 36 formed in the attaching portion 35 is configured so that, when the attaching leg 20 of the attaching clip 17 is inserted therethrough, a peripheral edge portion 36a thereof can be pressed against the outer peripheral surface 21b on a region of the insertion shaft portion 21 of the attaching leg 20, which is located more toward the base portion 21a than the locking claws 23. Specifically, in the embodiment, the attaching hole 36, as shown in FIG. 8, is opened in a generally rectangular shape having a broad width in the front-rear direction to allow the attaching leg 20 to be inserted therethrough and, on the vicinity of the middle of four sides thereof, has protrusions 37 and 38 arranged to integrally protrude inward from the peripheral edge portion. In particular, the attaching hole 36 is set so that an opening width dimension L1 thereof in the front-rear direction (see FIG. 8) and an opening width dimension L2 thereof in the upward-downward direction (see FIG. 8) are slightly smaller than a width dimension L3 in the front-rear direction and a width dimension L4 in the upward-downward direction of the insertion shaft portion 21 (see FIG. 5), and thus allows the peripheral edge portion 36a to be pressed against the outer peripheral surface 21b of the insertion shaft portion 21 when the insertion shaft portion 21 is inserted therethrough. Also, the protrusions 37 and 37 of the attaching hole 36, which are formed on sides thereof opposing to each other in the upward-downward direction and facing the locking claws 23 formed on the attaching leg 20, enter the recessed portions 21c on the base portion 21a of the insertion shaft portion 21 upon insertion of the attaching leg 20, so that ends 37a thereof are arranged to be oriented toward the outboard side O (see FIG. 9) and also can be abutted to end surfaces (the outer end surfaces 23c and the inner end surfaces 23d of the inboard-side ends 23b) of the locking claws 23 oriented in a separation direction (see FIG. 10). Namely, the protrusions 37 is dimensioned to have such a protruding amount from the peripheral edge portion 36a that the ends 37a oriented toward the outboard side O upon insertion of the attaching leg 20 do not climb over the outer end surfaces 23c of the inboard-side ends 23b of the locking claws 23

In the embodiment, the airbag 27, as shown in FIG. 7A, is constituted of a body portion 44 formed by double-weaving using a polyamide yarn, a polyester yarn or the like, and discrete clothes 45, 46, 47 and 48 formed by a woven fabric made of a polyamide yarn, a polyester yarn or the like and stitched to the body portion 44. The discrete cloth 45 constitutes a part for the plate-shaped portion 40 and the discrete cloth 46 constitutes a part for the plate-shaped portion 45. Also, the discrete cloth 47 constitutes a part of the attaching portions 35 and the discrete cloth 48 constitutes a part for the connection port portion 30. The body portion 44 is formed in a generally rectangular shape and constitutes parts for the front protective portion 29a, the rear protective portion 29b, the peripheral edge portion 33 and the plate-shaped portion 40. Meanwhile, in the airbag 27 of the embodiment, the part for the plate-shaped portion 40 is cut out from the body portion 44 fabricated by double-weaving and the cut part becomes the discrete cloth 48 constituting the connection port portion 30. In addition, on such a cut region of the body portion 44, the discrete cloth 45 is disposed to close the region, thereby forming the plate-shaped portion 40. Meanwhile, although the attaching portion 35 is formed by folding one sheet of cloth material in FIGS. 2 and 9, the attaching portion 35 is actually formed by folding two or more sheets of cloth material.

Figure 9:
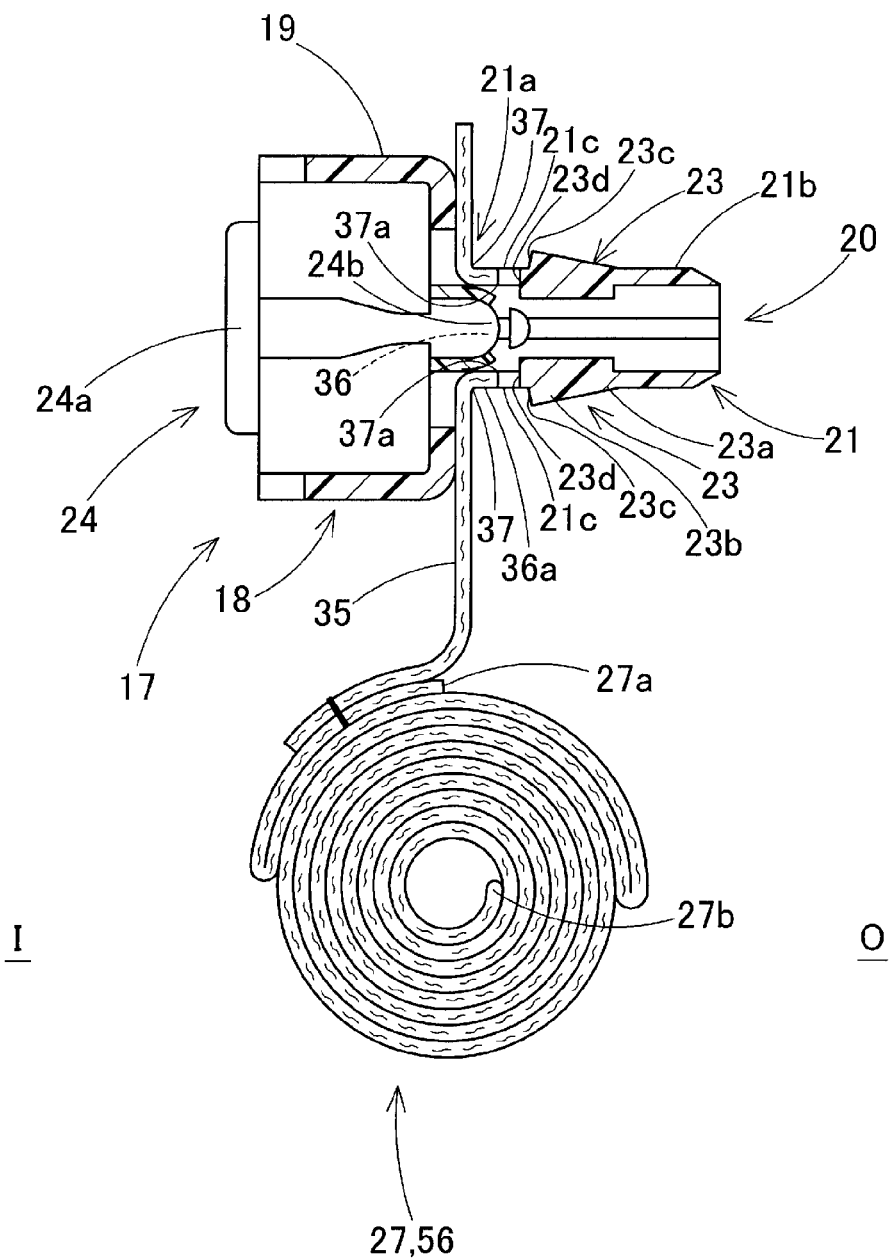
FIG. 9 is a schematic longitudinal sectional view along an inboard-outboard direction showing a state where the attaching clip is attached to the attaching portion of the airbag, corresponding to a section taken along a line IX-IX in FIG. 7.

In the embodiment, as shown in FIGS. 2 and 9, the airbag 27 is received in the case 50 in a folded state obtained by accordion-folding a region thereof on the upper edge 27a side and by roll-folding a lower side region thereof to be rolled from a lower edge 27b toward the outboard side O, and then mounted in the vehicle V.

Figure 4:
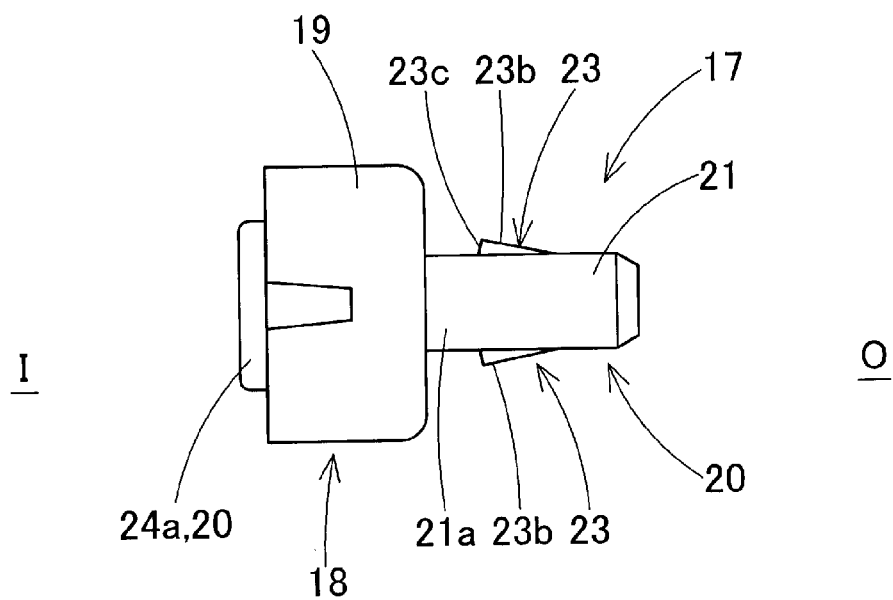
FIG. 4 is a side view of the attaching clip of FIG. 3.
Figure 5:
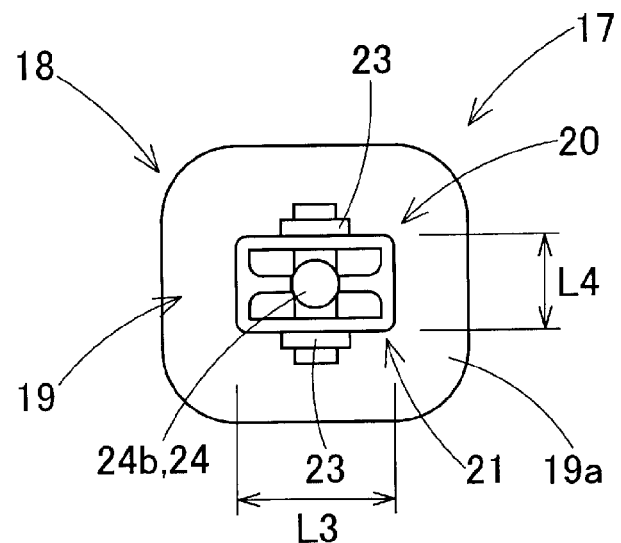
FIG. 5 is a rear view of the attaching clip of FIG. 3.

As shown in FIG. 2, the case 50 has a generally reverse U-shaped cross section allowing the folded airbag 27 to be received therein and is formed to be elongated in the front-rear direction. In the embodiment, as shown in FIG. 1, two cases, i.e., a case 50A for receiving a part of the folded airbag 27 corresponding to the front protective portion 29a and a case 50B for receiving a part thereof corresponding to the rear protective portion 29b are used. Each case 50 (50A and 50B) is formed of synthetic resin, such as polyolefin-based thermoplastic elastomer, and as shown in FIGS. 2 and 4, includes a celling wall portion 51 of a half-divided cylindrical shape and a vertical wall portion 52 extending downward from an edge on the outboard side O of the celling wall portion 51, thereby having a generally reverse U-shaped cross section. Meanwhile, the case 50A is formed so that a front end side thereof is bent downward to correspond to the upper edge of the window W1 on the front seat side, and the case 50B is formed in a straight line shape extending in the front-rear direction to correspond to the upper edge of the window W2 on the rear seat side.

In each of the cases 50A and 50B, a plurality of attaching pieces 53 extending upward are formed on the vicinity of the edge on the outboard side O of each ceiling wall portion 51 (see FIG. 2). Each attaching piece 53 is arranged at a location corresponding to each attaching portion 35 of the airbag 27 to be received. Meanwhile, a front end-side part of the airbag 27 is not received in the case 50A and thus the attaching portion 35 arranged on such front end side is directly attached to the inner panel 2 without interposing the attaching piece of the case therebetween.

Figure 11:
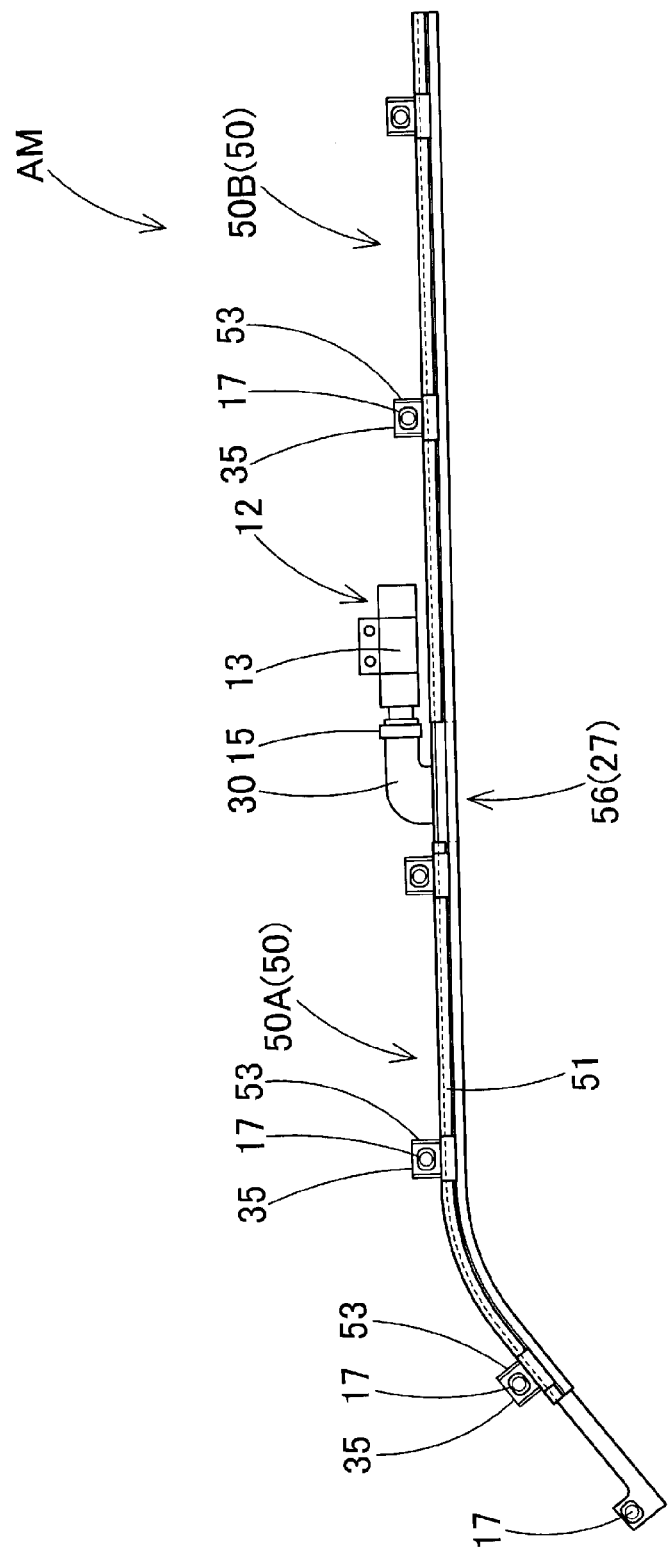
FIG. 11 is a front view showing an airbag assembly of the head protection airbag apparatus of the embodiment.

Each attaching piece 53 is formed in a generally rectangular plate shape capable of covering the outboard side O of the attaching portion 35 and has a through-hole 53a, through which the attaching leg 20 of the attaching clip 17 can be inserted. Meanwhile, in the case 50 of the embodiment, the ceiling wall portion 51 is configured so that parts thereof, on which the attaching pieces 53 are arranged, are cut out to allow the attaching portions 35, on which the attaching clips 17 have been previously attached, to be attached to the attaching pieces 53 (see FIGS. 2 and 11).

Next, procedures of mounting the head protection airbag apparatus M of the embodiment in the vehicle V will be described. First, the airbag 27, as shown in FIGS. 2, 7B and 9, is folded by accordion-folding a region thereof on the upper edge 27a side and then by roll-folding a lower side region thereof to roll the lower edge 27b toward the outboard side, thereby forming a completely folded body 56 with the connection port portion 30 and the attaching portions 35 protruding upward. Also, as shown in FIG. 7C, a breakable wrapping material 57 for preventing collapsing of such a folded state is wrapped around the completely folded body 56. Then, the attaching leg 20 of the attaching clip 17 is inserted into the attaching hole 36 of each attaching portion 35 protruding from the completely folded body 56, thereby attaching the attaching clip 17 to the attaching portion 35. According to the embodiment, at this time, the peripheral edge portion 36a of the attaching hole 36 is pressed against the outer peripheral surface 21b on a region of the insertion shaft portion 21 of the attaching leg 20, which is located more toward the base portion 21a than the locking claws 23, and the protrusions 37 protruding from the peripheral edge portion 36a of the attaching hole 36 are arranged to enter the recessed portions 21c of the insertion shaft portion 21, which are located more toward the base portion than the locking claws 23 (see FIGS. 9 and 10).

Next, the completely folded body 56 is received in the case 50 (50A and 50B) and the attaching leg 20 of the attaching clip 17 protruding from the attaching portion 35 is inserted through the through-hole 53a of the attaching piece 53, thereby locking the locking claws 23 on the peripheral edge of the through-hole 53a. In addition, the inflator 12 with the attaching bracket 13 attached thereon is inserted into the connection port portion 30 of the airbag 27 protruding from the completely folded body 56 and then the connection port portion 30 and the inflator 12 are connected to each other by the clamp 15, thereby forming the airbag assembly AM (see FIG. 11).

Then, when the attaching leg 20 of the attaching clip 17 protruding from the airbag assembly AM is inserted into the locking hole 3 formed in the inner panel 2 and the pushpin 24 is pushed toward the outboard side O to allow the expandable shaft portion 24b to be disposed between the locking claws 23, as shown in FIG. 2, the locking claws 23 can be locked on the peripheral edge of the locking hole 3, and as a result, the attaching portion 35, together with the attaching piece 53 of the case 50, can be attached to the inner panel 2 of the body 1. At the same time, the attaching bracket 13 of the inflator 12 is fixed at a predetermined location on the inner panel 2 using the bolts 14, thereby mounting the airbag assembly AM in the vehicle V. Then, a lead wire, not shown, extending from a control device for activating the inflator is connected to the inflator 12, and the front pillar garnish 5, the roof head lining 6, the center pillar garnish 7 and the rear pillar garnish 8 are attached to the inner panel 2 of the body 1, thereby mounting the head protection airbag apparatus M in the vehicle V.

After the head protection airbag apparatus M has been mounted in the vehicle V, if the inflation gas is flowed into the airbag 27, the inflating airbag 27 pushes and opens the airbag cover 10 while breaking the wrapping material 57 and then is deployed while protruding downward, thereby completing inflation thereof to cover the inboard sides of the windows W1 and W2, the center pillar CP and the rear pillar RP as shown by a two-dot chain line in FIG. 1.

In addition, according to the head protection airbag apparatus M of the embodiment, when the attaching leg 20 of the attaching clip 17 is inserted into the attaching hole 36 formed in the attaching portion 35 of the airbag 27, the peripheral edge portion 36a of the attaching hole 36 is pressed against the outer peripheral surface 21b on a region of the insertion shaft portion 21 of the attaching leg 20, which is located more toward the base portion 21a than the locking claws 23. Therefore, a high frictional force between the peripheral edge portion 36a of the attaching hole 36 and the outer peripheral surface 21b of the insertion shaft portion 21 is created, so that the insertion shaft portion 21 is hardly separated from the attaching hole 36 and upon temporarily fixing, the attaching clip 17 can be temporarily fixed to the attaching portion 35 by inserting the attaching leg 20 of the attaching clip 17 into the attaching hole 36 without using a spacer, thereby keeping the attaching clip 17 temporarily fixed to the attaching portion 35. As a result, no spacer is required, thereby reducing the number of components. Also, because all one has to do is insert the attaching leg 20 into the attaching hole 36, an operation of attaching a spacer is unnecessary, thereby reducing working man-hours.

Thus, according to the head protection airbag apparatus M of the embodiment, the attaching clip 17 can be temporarily fixed to the attaching portion 35 without using a spacer.

Also, according to the head protection airbag apparatus M of the embodiment, when an area, where the airbag 27 is fabricated, and an area, where an airbag apparatus (airbag assembly AM0 is mounted in the vehicle V, are separated from each other, the fabricated airbag 27 can be folded in the airbag fabrication area and transported in a state where the attaching clip 17 is attached to the attaching portion 35 of the completely folded body 56, and, in an area, where the vehicle V is fabricated, the completely folded body 56 can be received in the case 50, the inflator 12 can be mounted thereon to form the airbag assembly AM, and then the resulted airbag assembly AM can be mounted in the vehicle V. Therefore, the degree of freedom in fabrication procedures can be increased.

Figure 10:
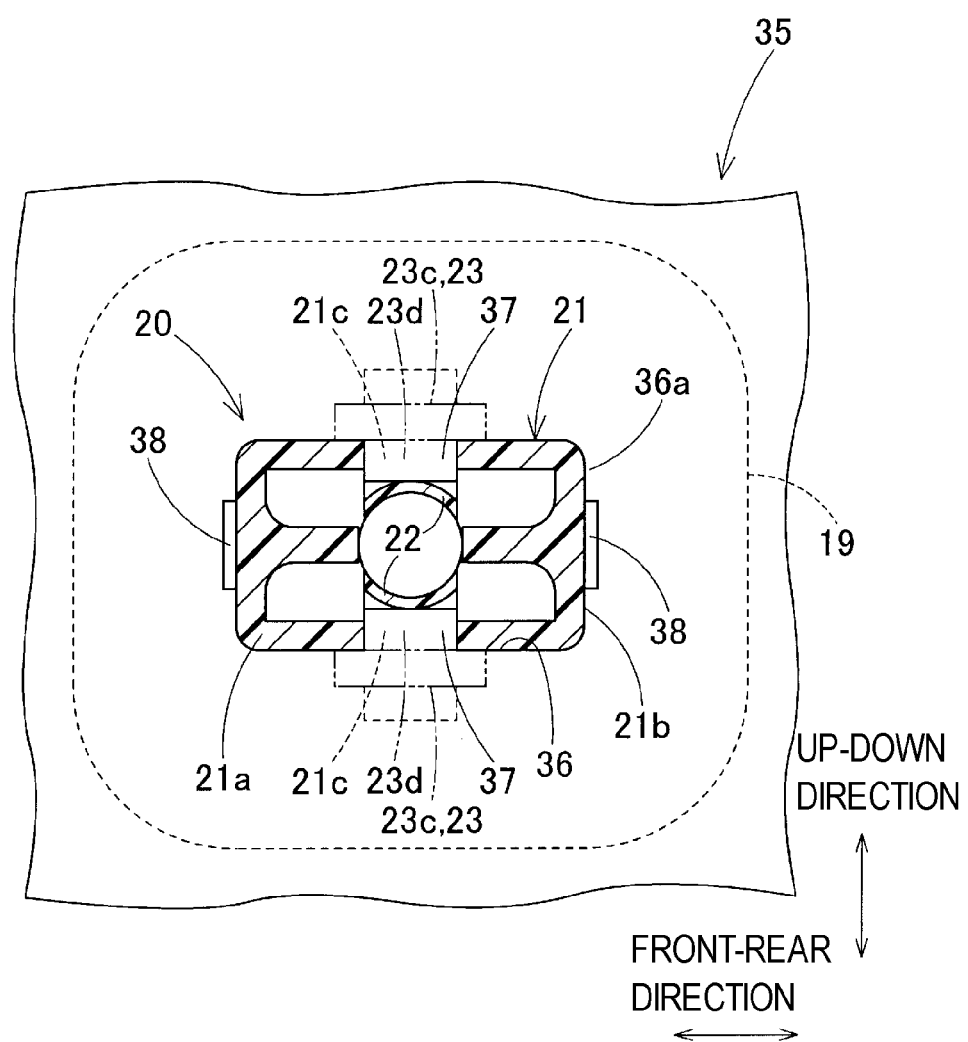
FIG. 10 is a schematic longitudinal sectional view along a front-rear direction showing a state where the attaching clip is attached to the attaching portion of the airbag.

In addition, according to the head protection airbag apparatus M of the embodiment, the protrusions 37 intended to be abutted to end surfaces (the outer end surfaces 23c and the inner end surfaces 23d of the inboard-side ends 23b) of the locking claws 23 oriented in a separation direction are arranged on sides of the peripheral edge portion 36a of the attaching hole 36, which are opposed to each other in the upward-downward direction and face the locking claws 23, to integrally protrude from the peripheral edge portion 36a (see FIGS. 9 and 10). Therefore, the protrusions 37 can be locked on the outer end surfaces 23c and the inner end surfaces 23d of the locking claws 23, thereby further inhibiting the attaching leg 20 from being separated from the attaching hole 36. In particular, according the head protection airbag apparatus M of the embodiment, the recessed portions 21c are formed by recessing the outer peripheral surface 21b on a region of the insertion shaft portion 21 of the attaching leg 20, which is located more toward the base portion 21a than the locking claws 23, and as shown in FIG. 10, the protrusions 37 enter the recessed portions 21c and are arranged so that the ends 37a thereof are oriented toward the outboard side O. Therefore, the protrusions 37 are hardly removed from the recessed portions 21c and as a result, a locked state of the protrusions 37 on the outer end surfaces 23c and the inner end surfaces 23d of the locking claws 23 can be accurately kept. In addition, according to the head protection airbag apparatus M of the embodiment, the protrusions 38 and 38 are also formed on sides of the peripheral edge portion 36a of the attaching hole 36, which are opposed to each other in the front-rear direction, to protrude from the peripheral edge portion 36a. By arranging the protrusions 38 and 38, a contact area between the peripheral edge portion 36a of the attaching hole 36 and the outer peripheral surface 21b of the insertion shaft portion 21 is increased, thereby creating a higher frictional force therebetween. If this is not considered, the attaching hole may be configured so that protrusions are arranged on parts thereof corresponding to the locking claws.

Figure 12:
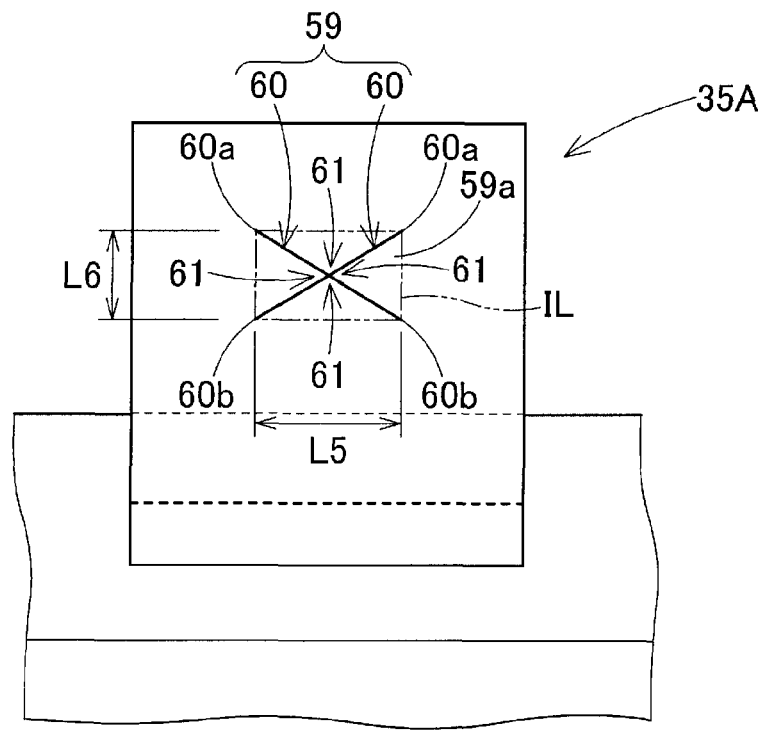
FIG. 12 is a partially enlarged front view showing a region of an attaching portion of an airbag according to another embodiment of the invention.

A shape of the attaching hole formed in the attaching portion is not limited to one as described above, and accordingly, for example, as in an attaching portion 35A shown in FIG. 12, two slits 60 and 60 may be formed in a 'X' shape and an attaching hole 59 may be formed by two slits 60 and 60. In a case of the attaching hole 59 configured in this way, a rectangular shape phantom line IL (see a two-dot chain line in FIG. 1), which is drawn to connect end edges 60a and 60b of the slits 60 and 60 to each other, actually becomes an opening when the attaching leg 20 of the attaching clip 17 is inserted therethrough to open the slits 60 and 60, and the phantom line IL defines a peripheral edge portion 59a of the attaching hole 59. Also, two slits 60 and 60 are set so that spacing distances L5 and L6 between end edges 60a and 60b (see FIG. 12) are smaller than a width dimension L3 in the front-rear direction and a width dimension L4 in the upward-downward direction of the insertion shaft portion 21 of the attaching leg 20, and thus allows the peripheral edge portion 59a to be pressed against the outer peripheral surface 21b of the insertion shaft portion 21 when the insertion shaft portion 21 is inserted therethrough. Further, in the attaching hole 50 configured in this way, regions of the attaching portion 35A between the slits 60 form protrusions 61 integrally protruding inward from the peripheral edge portion 59a when the attaching leg 20 is inserted therethrough to open the slits 60. Meanwhile, the attaching hole 59 is likewise preferably configured so that ends of the protrusions 61 do not climb over the inboard-side ends 23b of the locking claws 23 when the attaching leg 20 is inserted therethrough.

Figure 13:
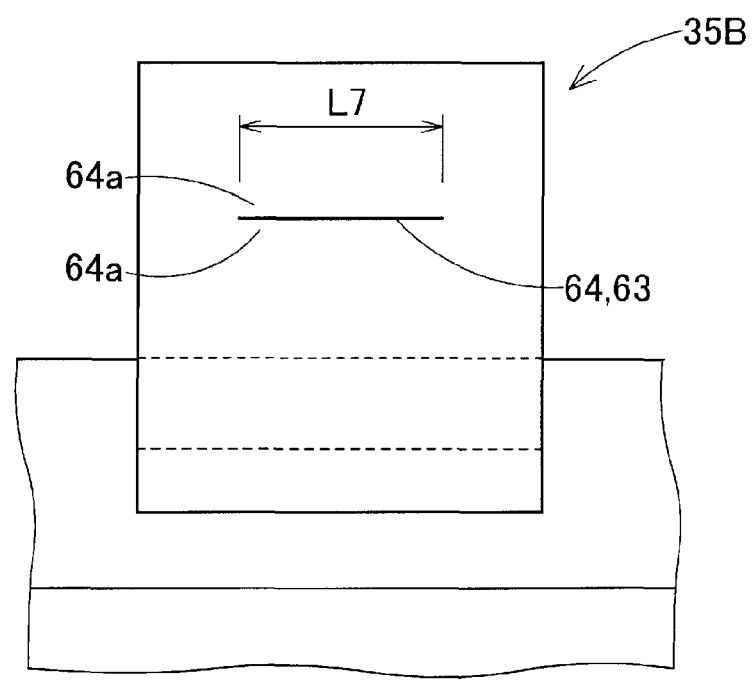
FIG. 13 is a partially enlarged front view showing a region of an attaching portion of an airbag according to further another embodiment.

Further, as in an attaching portion 35B shown in FIG. 13, an attaching hole 63 may be defined by one slit 64 arranged generally along the front-rear direction. In the attaching hole 63 configured in this way, the attaching leg 20 of the attaching clip 17 is inserted therethrough to push and open the slit 64, but if a length dimension L7 thereof (see FIG. 13) is set to be smaller than the sum of a width dimension L3 in the front-rear direction and a width dimension L4 in the upward-downward direction of the insertion shaft portion 21, an aspect, in which the insertion shaft portion 21 is pushed into a gap formed by pushing and opening the slit 64, can be obtained. Therefore, upon insertion of the insertion shaft portion 21, a peripheral edge portion 64a of the slit 64 is pressed against the outer peripheral surface 21b of the insertion shaft portion 21, thereby inhibiting the insertion shaft portion 21 from being moved relative to the attaching portion 35B to be separated from the attaching hole 63.

Figure 14:
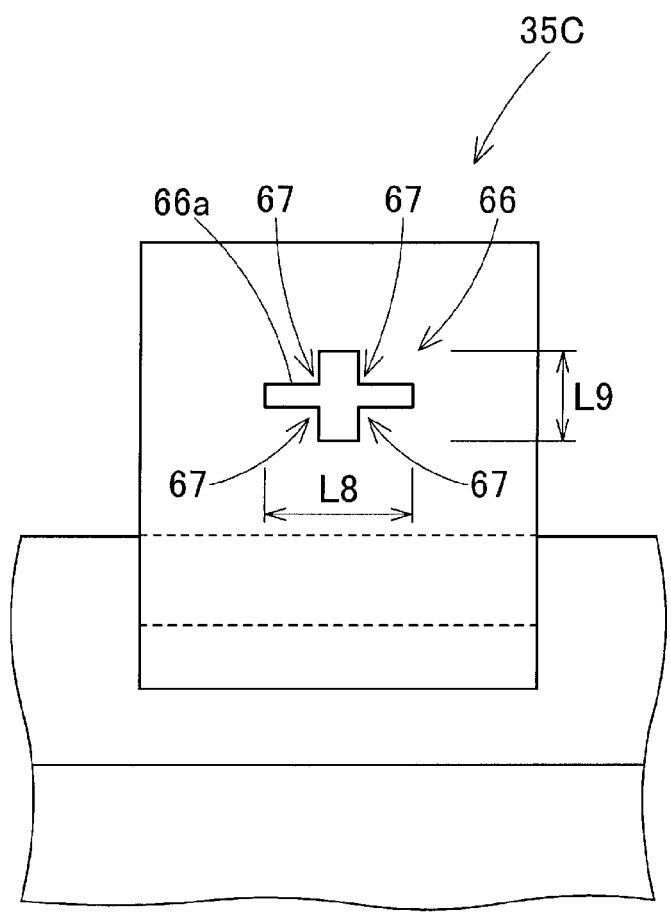
FIG. 14 is a partially enlarged front view showing a region of an attaching portion of an airbag according to further another embodiment.

In addition, as in an attaching portion 35C shown in FIG. 14, an attaching hole 66 may be opened in a generally cross shape. Namely, the attaching hole 66 has a shape in which protrusions 67 are arranged in four corners thereof to integrally protrude inward a peripheral edge portion 66a. Likewise, the attaching hole 66 is also set so that an opening width dimension L8 thereof in the front-rear direction and an opening width dimension L9 thereof in the upward-downward direction (see FIG. 14) are smaller than a width dimension L3 in the front-rear direction and a width dimension L4 in the upward-downward direction of the insertion shaft portion 21. Therefore, upon insertion of the insertion shaft portion 21, the peripheral edge portion 66a is pressed against the outer peripheral surface 21b of the insertion shaft portion 21. Also, because the attaching hole 66 does not have protrusions intended to be abutted to the locking claws, but has the protrusions 67 formed in four corners thereof, a contact area between the peripheral edge portion 66a of the attaching hole 66 and the outer peripheral surface 21b of the insertion shaft portion 21 is increased by arranging such protrusions 67, thereby creating a higher frictional force therebetween.

Meanwhile, in the foregoing embodiment, although one, which has only a pair of locking claws 23 and 23 arranged to be opposed to each other in the upward-downward direction, is employed as the attaching clip 17, an attaching clip, which has two pair of locking claws respectively arranged to be opposed to each other in directions generally perpendicular to the axial direction of the insertion shaft portion, may be employed.

What is claimed is:

1. A head protection airbag apparatus comprising:
    an airbag that is made of a flexible sheet material, has a bag shape into which an inflation gas is flowable, is folded and received in an upper edge of a window of a vehicle and is deployed and inflated to cover the window,
    wherein the airbag is configured so that an attaching portion arranged on an upper edge thereof upon completion of inflation is attached to a body of the vehicle using an attaching clip,
    wherein the attaching portion includes an attaching hole to which the attaching clip is insertable,
    wherein the attaching clip includes an attaching leg with which the attaching portion is attachable to a the body by being inserted into a locking hole formed in the body while being inserted in the attaching hole,
    wherein the attaching leg includes an insertion shaft portion adapted to be inserted in the locking hole and at least a pair of locking claws arranged to be opposed to each other in a direction generally perpendicular to an axial direction of the insertion shaft portion and formed to protrude outward from the insertion shaft portion,
    wherein the locking claws is formed to protrude from the insertion shaft portion while being expanded toward a base portion of the insertion shaft portion,
    wherein, when the insertion shaft portion is inserted into the locking hole, the locking claws is first bent and then restored to be locked on a peripheral edge of the locking hole,
    wherein the attaching hole is configured so that, when the attaching leg is inserted through the attaching hole, an peripheral edge portion of the attaching hole is pressed against an outer peripheral surface side on a region of the insertion shaft portion which is located more toward the base portion than the locking claws,
    wherein a protrusion, protruded from the attaching hole of the attaching portion, or from the peripheral edge portion, contacts with the outer peripheral surface of the insertion shaft portion of the attaching leg corresponding to the base portion as a surface contact.

2. The head protection airbag apparatus according to claim 1, wherein the attaching hole includes, on at least two sides of the peripheral edge portion corresponding to the locking claws, a plurality of the protrusions intended to be abutted to end surfaces of the locking claws oriented in a separation direction and arranged to integrally protrude from the peripheral edge portion.

3. A head protection airbag apparatus comprising:
    an airbag that is made of a flexible sheet material, has a bag shape into which an inflation gas is flowable, is folded and received in an upper edge of a window of a vehicle and is deployed and inflated to cover the window,
    wherein the airbag is configured so that an attaching portion arranged on an upper edge thereof upon completion of inflation is attached to a body of the vehicle using an attaching clip,
    wherein the attaching portion includes an attaching hole to which the attaching clip is insertable,
    wherein the attaching clip includes an attaching leg with which the attaching portion is attachable to a the body by being inserted into a locking hole formed in the body while being inserted in the attaching hole,
    wherein the attaching leg includes an insertion shaft portion adapted to be inserted in the locking hole and at least a pair of locking claws arranged to be opposed to each other in a direction generally perpendicular to an axial direction of the insertion shaft portion and formed to protrude outward from the insertion shaft portion,
    wherein the locking claws is formed to protrude from the insertion shaft portion while being expanded toward a base portion of the insertion shaft portion,
    wherein, when the insertion shaft portion is inserted into the locking hole, the locking claws is first bent and then restored to be locked on a peripheral edge of the locking hole, and
    wherein the attaching hole is configured so that, when the attaching leg is inserted through the attaching hole, an peripheral edge portion of the attaching hole is pressed against an outer peripheral surface side on a region of the insertion shaft portion which is located more toward the base portion than the locking claws,
    wherein the attaching hole includes, on at least two sides of the peripheral edge portion corresponding to the locking claws, protrusions intended to be abutted to end surfaces of the locking claws oriented in a separation direction and arranged to integrally protrude from the peripheral edge portion.

* * * * *